3,232,963
16,16-ETHYLENETESTOSTERONE DERIVATIVES
Vlasios Georgian, Belmont, Mass., assignor to Trustees of Tufts College, Medford, Mass., a corporation of Massachusetts
No Drawing. Filed Sept. 30, 1963, Ser. No. 312,300
5 Claims. (Cl. 260—397.3)

This invention relates to novel testosterone derivatives and more specifically to 16,16 - ethylenetestosterones. These compounds have anabolic-androgenic activity as exhibited by the parent testosterone.

The compounds of this invention may be represented by the following general structural formula:

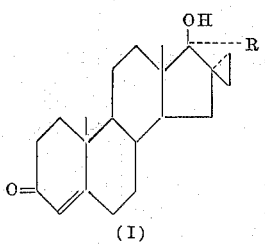

(I)

in which R is hydrogen or methyl, and are prepared according to the following reaction scheme:

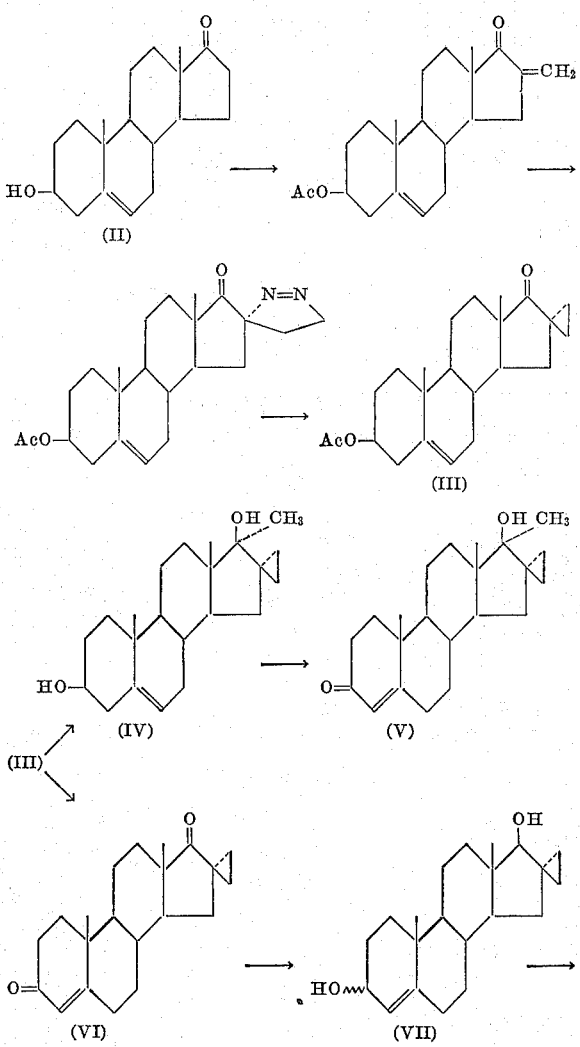

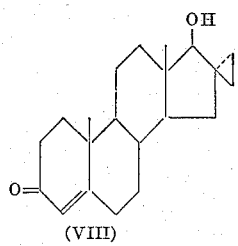

(VIII)

Thus, as shown above dehydroepiandrosterone (II) is converted to 16 - methylene-3β-acetoxy-5-androstene-17-one by a Mannich condensation which in turn is treated with an excess of ethereal diazomethane to give the pyrazoline. The pyrazoline is transformed to the 16,16-ethylene-3β-acetoxy-5-androstene-17-one (III) by pyrolysis at 160° C. or by catalysis with boron trifluoride-etherate in acetone solution at room temperature. Treatment of III with excess methyl Grignard reagent gives the diol (IV) which is converted to 16,16-ethylene-17α-methyltestosterone (V) by an Oppenauer oxidation.

Hydrolysis of III to the free alcohol, followed by an Oppenauer oxidation gives 16,16-ethylene-4-androstene-3,17-dione (VI). The latter is reduced with sodium borohydride to a mixture of diols (VII) which is allylically oxidized to 16,16-ethylenetestosterone (VIII), employing dichloro-dicyanoquinone.

It will be obvious from the above description that compounds such as III or its free alcohol and VI are especially useful as intermediates to prepare the products V and VIII. The following examples illustrate the preparative procedures outlined above and will make fully apparent the utility of various compounds as intermediates.

*Example 1*

To a solution of 16-methylene-3β-acetoxy-5-androstene-17-one (7.0 g.) in 300 ml. of dry ether is gradually added at room temperature a diazomethane solution in ether (prepared from 15 g. of nitrosomethyl urea, 50 ml. of 40% potassium hydroxide solution and 300 ml. of ether). The resultant solution is kept for two days at room temperature and then evaporated to give the 16,16-pyrazoline, M.P. 161° C. (dec.).

The pyrazoline (2.0 g.) suspended in 10 ml. of dry acetone is treated with 1.0 ml. of boron trifluoride-etherate. The mixture is allowed to stand for one and one-half hours at room temperature. The excess acetone is removed by blowing with nitrogen gas and the residue is diluted with water to given the solid 16,16-ethylene-3β-acetoxy-5-androstene-17-one, M.P. 131–132° C. The same product is obtained by pyrolysis of the pyrazoline (2.0 g.) at 160° C. for five minutes in an atmosphere of nitrogen.

The above-prepared acetate (1.7 g.) is hydrolyzed in 50 ml. of methanol with 950 mg. of potassium hydroxide in 5 ml. of water at room temperature overnight. The solvent is removed in vacuo and the residue treated with water to give the 16,16-ethylene-5-androstene-3β-ol-17-one, M.P. 173–174° C.

A solution of the latter compound (1.47 g.) in 150 ml. of dry toluene and 10 ml. of cyclohexanone is heated to remove moisture and then a solution of 2.0 g. of aluminum isopropylate in 25 ml. of dry toluene is gradually added. The mixture is refluxed for 30 minutes and to the hot solution, water is added dropwise to precipitate the aluminum oxide. The clear filtrate is steam distilled to give a residue which is extracted with ether. Evaporation of the dry etheral extract gives 16,16-ethylene-4-androstene-3,17-dione, M.P. 167–168.4° C.

To a solution of 500 mg. of the dione in 20 ml. of ethyl alcohol is added a solution of 100 mg. of sodium borohydride in 2.0 ml. of water and the mixture is kept at room temperature for three hours. A few drops of acetic acid is added and the solution evaporated in vacuo to give 16,16,-ethylene-5 - androstene - 3ξ,17β-diol, M.P. 161–168° C.

To a solution of the crude diol (316 mg.) in 5 ml. of dry dioxane is added a solution of 250 mg. of dichloro dicyanoquinone in 2 ml. of dioxane at room temperature and the mixture kept overnight. The filtrate is evaporated in vacuo and the residue is extracted with ether. The extract is washed with 2% potassium hydroxide solution and then with water until neutral. Evaporation of the ether gives 16,16-ethylenetestosterone, M.P. 167–169° C.

Example 2

A solution of 1.0 g. of 16,16-ethylene-3β-acetoxy-5-androstene-17-one (prepared as in Example 1) in 150 ml. of dry ether is added to a cold Grignard reagent solution, prepared from 700 mg. of magnesium, 6.0 g. of methyl iodide and 40 ml. of dry ether. The mixture is heated to reflux for nine hours and then treated with 40% ammonium chloride solution. The decanted ethereal solution is washed with water, dried and evaporated. The residue is solidified on standing overnight in the cold and is crystallized from acetone to give 16,16-ethylene-17α-methyl-5-androstene-3β,17β-diol, M.P. 155–157° C.

To a hot solution of 600 mg. of the diol in 100 ml. of dry toluene and 4.0 ml. of cyclohexanone is added 750 mg. of aluminum isopropylate in 25 ml. of dry toluene and the mixture is refluxed for 30 minutes. Water is then added dropwise and the resulting clear filtrate is steam distilled. The residue is extracted with ether and the dried extract is evaporated. The residue is crystallized from dilute methanol to give 16,16-ethylene-17α-methyltestosterone, M.P. 154–156° C.

What is claimed is:
1. A chemical compound of the formula:

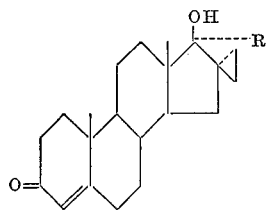

wherein R is a member selected from the group consisting of hydrogen and methyl.

2. A chemical compound of the formula:

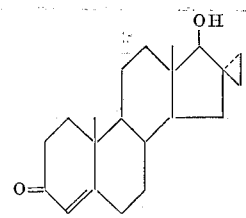

3. A chemical compound of the formula:

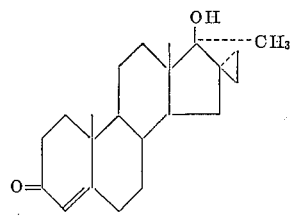

4. A chemical compound of the formula:

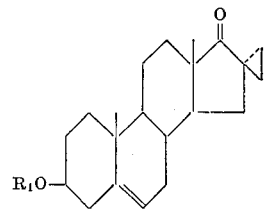

wherein $R_1$ is a member selected from the group consisting of hydrogen and acetyl.

5. A chemical compound of the formula:

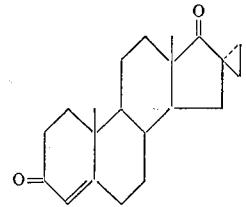

References Cited by the Examiner

Georgian et al.: "Chemistry and Industry," Oct. 6, 1962, pages 1755 to 1757 are relied on.

LEWIS GOTTS, *Primary Examiner.*

ELBERT L. ROBERTS, *Examiner.*